April 12, 1927.  K. W. BARTLETT  1,624,382
WATER SOFTENING APPARATUS
Filed June 7, 1920
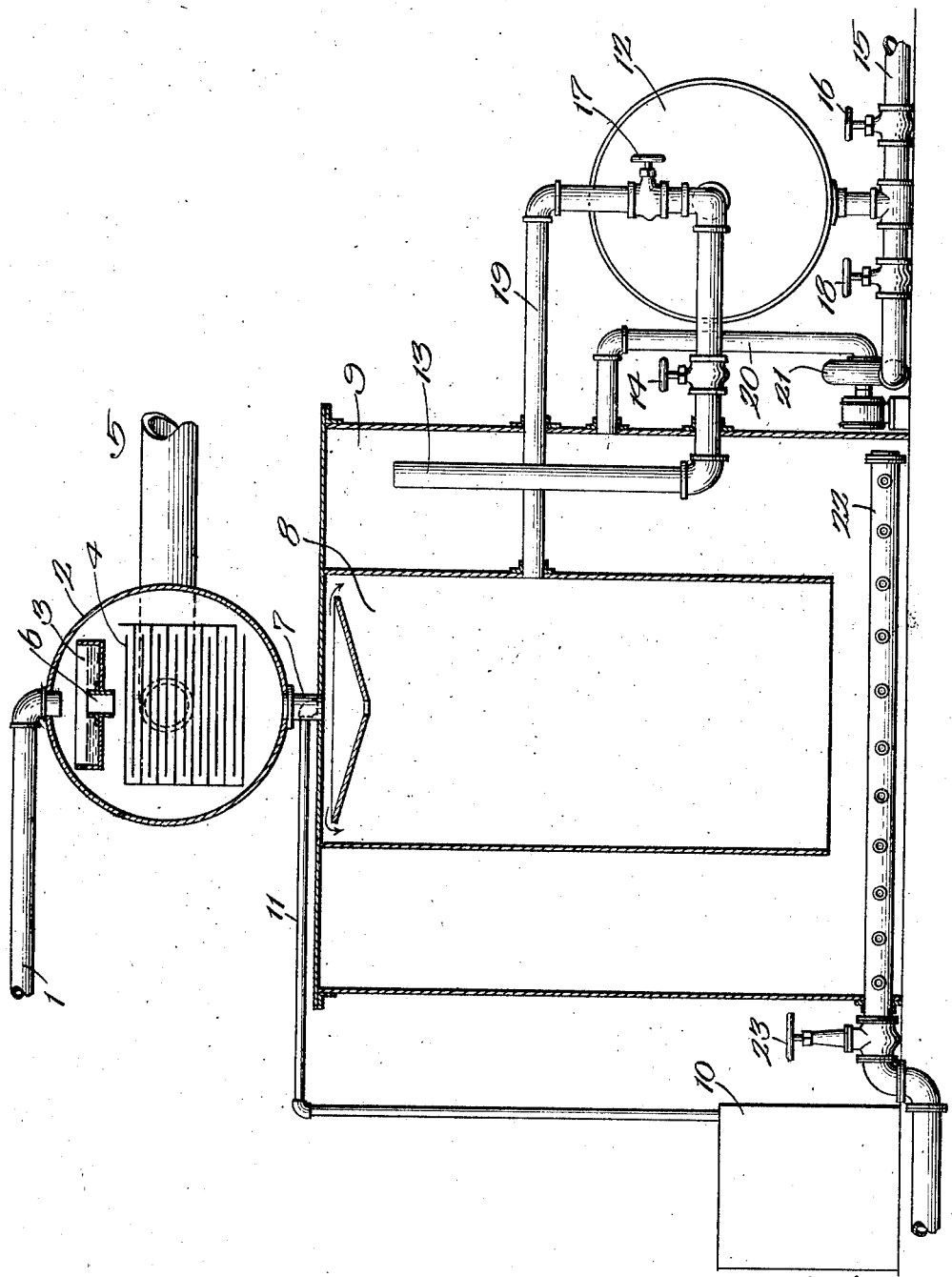

Patented Apr. 12, 1927.

1,624,382

UNITED STATES PATENT OFFICE.

KENT W. BARTLETT, OF HAMMOND, INDIANA.

WATER-SOFTENING APPARATUS.

Application filed June 7, 1920. Serial No. 387,146.

My invention relates to water softening apparatus employing filters, the invention having for its object the provision of means whereby the softened water may be used to flush out or wash the filters without wastage of the water. As I have equipped the apparatus embracing my invention the filter serves to filter the water after it is softened, though the invention is not to be restricted to this use of the filter.

In the preferred embodiment of the invention a tank is employed having one chamber into which the water to be treated is discharged and in which the major portion of the softening process occurs and another chamber from which the softened water is passed to the filter, the water to be treated being heated before it is passed into the first chamber. When the apparatus is thus equipped I preferably flush the filter with softened water received in the second tank chamber the better to perform the flushing operation. The flushing water is preferably returned from the filter to the first chamber of the tank, a pump being desirably employed for forcing the flow of flushing water through the filter.

I will explain my invention more fully by reference to the accompanying drawing somewhat diagrammatically illustrating the preferred embodiment thereof.

The apparatus illustrated includes a source of water that is to be treated shown in the drawing as being a pipe 1 that may be a city service pipe. This pipe discharges into a heating drum 2, the water first finding passage into a trough 3 from which it is discharged upon a series of baffle plates 4. Steam passes through the pipe 5 into the heating drum and upon the baffle plates so that the water flowing from the trough 3 through the discharge opening 6 is brought to a proper degree of temperature suited to the softening process. Water is discharged from the heating drum through a suitable pipe 7 into one chamber 8 of a settling tank, the water being discharged from the lower end of the chamber 8 into the chamber 9 of the same tank, the chamber 9 desirably surrounding the chamber 8. A suitable water softening chemical is introduced into the water that enters the first chamber 8, such introduction desirably occurring at the pipe 7. The chemical passes from a suitable chemical source 10 through the pipe 11 into the chamber 8 where the water enters this chamber. The chemical may be introduced at other places however without departing from the spirit of my invention.

A filter 12, of any suitable construction, preferably serves to filter the water after it is softened, though the invention is not to be thus restricted. As illustrated, a pipe 13 connects the upper portion of the tank chamber 9 with the filter to pass softened water to the filter, this pipe having a valve 14 for interrupting the flow of softened water therethrough. A service pipe 15 passes the softened filtered water to boilers or other points of consumption, this pipe having a valve 16 for interrupting the flow of the filtered softened water therethrough. In the normal operation of the apparatus the valves 14 and 16 are opened. When the filter is to be washed or flushed these valves 14 and 16 are closed and valves 17 and 18 are opened. The valve 17 is included in a pipe 19 that connects the hot water chamber 8 with the filter for the purpose of returning filter flushing water to said chamber, the flushing softened water finding passage to the filter through the piping 20 that connects the filter with the chamber 9. A pump 21 is included in pipe 20. The pump serves to effect the forced flow of flushing water from the softened water chamber 9 through the filter and then pipe 19 back to the hot water chamber 8. The flushing water thus flows in a closed circuit that includes the water within the settling tank so that this water is not wasted. When the flushing operation has been concluded the valves 17 and 18 are closed and the valves 14 and 16 are opened whereupon the normal flow of water through the apparatus is resumed.

The sludge that forms in the bottom of the settling tank may be withdrawn through the sludge pipe 22 when the normally closed valve 23 is opened.

The pump 21 is preferably a rotary pump so that it may be reversed in operation for the purpose of causing a down flow of water through the pipe 13, the filter, the pump (valve 16 being closed), the pipe 20, to the chamber 9 for the purpose of removing from the filter remnants of the filter washing water.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Water softening apparatus including a source of water that is to be treated; means for heating the water coming from said source; a settling tank having one chamber receiving the water to be treated and discharging at its lower end into a second chamber of the tank; means for introducing softening chemical into the water that enters the first aforesaid chamber of the tank; a filter; a pipe connecting the second chamber with the filter to pass softened water to the filter and having a valve for interrupting the flow of softened water therethrough; a service pipe through which filtered water passes from the filter and having a valve for interrupting the flow of filtered softened water therethrough; piping connecting the first aforesaid tank chamber with the filter through which water may be passed from the filter to said first chamber and having a valve for interrupting flow of water therethrough; and a pump for forcing the flow of water that passes through the latter piping.

2. Water softening apparatus including a source of water that is to be treated; a settling tank having one chamber receiving the water to be treated and discharging into a second chamber of the tank; means for introducing softening chemical into the water that enters the first aforesaid chamber of the tank; a filter; a pipe connecting the second chamber with the filter to pass softened water to the filter and having a valve for interrupting the flow of softened water therethrough; a service pipe through which filtered water passes from the filter and having a valve for interrupting the flow of filtered softened water therethrough; piping connecting the first aforesaid tank chamber with the filter through which water may be passed from the filter to said first chamber and having a valve for interrupting flow of water therethrough; and a pump for forcing the flow of water that passes through the latter piping.

3. Water softening apparatus including a source of water that is to be treated; means for heating the water coming from said source; a settling tank having one chamber receiving the water to be treated and discharging at its lower end into a second chamber of the tank; means for introducing softening chemical into the water that enters the first aforesaid chamber of the tank; a filter; a pipe connecting the second chamber with the filter to pass softened water to the filter and having a valve for interrupting the flow of softened water therethrough; a service pipe through which filtered water passes from the filter and having a valve for interrupting the flow of filtered softened water therethrough; and piping connecting the first aforesaid tank chamber with the filter through which water may be passed from the filter to said first chamber and having a valve for interrupting flow of water therethrough.

4. Water softening apparatus including a source of water that is to be treated; a settling tank having one chamber receiving the water to be treated and discharging into a second chamber of the tank; means for introducing softening chemical into the water that enters the first aforesaid chamber of the tank; a filter; a pipe connecting the second chamber with the filter to pass softened water to the filter and having a valve for interrupting the flow of softened water therethrough; a service pipe through which filtered water passes from the filter and having a valve for interrupting the flow of filtered softened water therethrough; and piping connecting the first aforesaid tank chamber with the filter through which water may be passed from the filter to said first chamber and having a valve for interrupting flow of water therethrough.

5. Water treating apparatus comprising a treating chamber, means for supplying water to one end of said treating chamber, an up-take chamber adjacent to said treating chamber and in communication with a filter, means for withdrawing water from said up-take chamber and passing said water through said filter, a connection with one of said chambers intermediate the ends thereof and independent of said last named means for supplying wash water to said filter, and a connection for conducting the wash water back to one of said chambers.

6. Liquid treating apparatus comprising a pair of chambers in communication with each other, means for supplying liquid to one of said chambers, a filter, a valve-controlled connection from each of said chambers to one side of said filter, a connection from the opposite side of said filter to one of said chambers, and a liquid-forcing pump in said last named connection.

7. Water treating apparatus comprising a treating tank, an up-take chamber forming a part of said treating tank, a filter, means for conveying water from the said up-take chamber through said filter in one direction, means for conveying water from said up-take chamber through said filter in the opposite directions, and means for conveying said last named water from said filter to said treating tank.

8. Boiler feed water treating apparatus comprising a treating tank, a filter, means for passing wash water from said treating tank in reverse direction through said filter, and means for returning said wash water after passage through said filter to said treating tank.

9. The process of treating water, which consists in continuously supplying water mixed with softening reagent, passing a portion of said water through a filter, washing the filter with a portion of said water, and returning the wash water to the supply of unfiltered water.

10. Water treating apparatus comprising a treating tank, means for supplying water into the top of said treating tank, an up-take chamber adjacent to said treating tank and communicating with the lower end thereof, a filter, a conduit connecting said up-take chamber with said filter, means for removing filtered water from said filter, a conduit communicating with said up-take chamber intermediate the working water level and the intake end of said up-take chamber for supplying wash water to said filter, and a conduit for returning said wash water to said treating tank.

11. The process of treating water, which consists in passing a stream of water downwardly through a treating tank and upwardly in an up-take chamber, withdrawing water from said up-take chamber and passing it through a filter, withdrawing water from said stream during its flow through said treating tank and up-take chamber, washing said filter therewith, and returning said filter wash-water to said stream.

12. The process of treating water, which consists in flowing a stream of water and softening reagent downwardly through a treating chamber and upwardly through an up-take chamber, drawing water from said up-take chamber and filtering the same, drawing water from said stream of water after it reaches said up-take chamber and washing said filter therewith, and returning the filter wash water to said stream.

13. Water softening apparatus comprising a treating tank, a water heater delivering into said treating tank, means for supplying water to said heater, an up-take chamber surrounding the said treating tank having its lower end open and directed toward the bottom of said treating tank, a filter, an overflow pipe for conducting water from said up-take chamber through said filter, means for drawing water from said chamber at a point below the working water level in said chamber and above said open end thereof and passing it through said filter, and a conduit for conveying said wash water back to said treating tank.

14. Water treating apparatus comprising a treating chamber, an up-take chamber communicating with the lower end of said treating chamber, means for supplying water and softening reagent to the top of said treating chamber, a filter, a conduit connecting said up-take chamber with said filter, a conduit for withdrawing water from one of said chambers at a point between the working water level in said up-take chamber and the bottom thereof for washing said filter, and means for returning wash water from said filter into the said treating chamber.

15. Boiler feed water softening apparatus comprising a treating chamber, an up-take chamber, a filter, means for withdrawing water from said uptake chamber and passing it through said filter, means for withdrawing water from one of said chambers and passing it in reverse direction through said filter, and means for returning water from said filter to the said treating chamber, one of said chambers being disposed within the other.

16. Water softening apparatus comprising a treating chamber, a water heater on top of said treating chamber, an up-take chamber, a filter, means for withdrawing water from said up-take chamber and passing it through said filter in one direction, means for withdrawing water from one of said chambers and passing it through said filter in the reverse direction, and means for returning said last named water to said treating chamber.

17. Water treating apparatus comprising a treating tank, means for supplying water and softening reagent into the top of said treating tank, an up-take chamber communicating with said treating tank, a filter, a pipe for withdrawing water from said up-take chamber and passing it to said filter, a conduit communicating with said uptake chamber remote from the upper end thereof for supplying water to said filter, and a conduit connecting said filter with the said treating tank.

18. Water treating apparatus comprising a treating chamber, an up-take chamber in communication with said treating chamber, said up-take chamber extending upwardly from adjacent the lower end of said treating chamber, a filter, a conduit connecting the upper portion of said up-take chamber with the normal inlet side of said filter, and a second conduit connecting said treating chamber with the normal inlet side of said filter for reverse washing thereof.

19. Water softening apparatus including a tank for receiving water to be softened; means for heating the water entering the tank; means for supplying softening chemical to the water entering the tank; a filter through which softened water is passed from the tank and from which filtered water is taken for service; and piping through which softened water from the tank is passed through the filter and back to the tank; and a pump for forcing the flow of water passing through said piping.

20. Water softening apparatus including a settling tank for receiving water to be softened; means for supplying softening chemical to the water entering the tank; a filter through which softened water is passed from the tank and from which filtered water is taken for service; and piping through which softened water from the tank is passed through the filter and back to the tank; and a pump for forcing the flow of water passing through said piping.

21. Water softening apparatus including a settling tank for receiving water to be softened; means for heating the water entering the tank; means for supplying softening chemical to the water entering the tank; a filter through which softened water is passed from the tank and from which filtered water is taken for service; and piping through which water from the tank is passed through the filter and back to the tank.

22. Water softening apparatus including a settling tank for receiving water to be softened; means for supplying softening chemical to the water entering the tank; a filter through which softened water is passed from the tank and from which filtered water is taken for service; and piping through which water from the tank is passed through the filter and back to the tank.

23. Water softening apparatus including a settling tank for receiving water to be softened; means for heating the water entering the tank; means for supplying softening chemical to the water entering the tank; a filter; piping through which water is passed from the tank to the filter and from the filter to the tank; and a pump for forcing the flow of water passing through said piping in either direction.

24. Water softening apparatus including a settling tank for receiving water to be softened; means for supplying softening chemical to the water entering the tank; a filter; piping through which water is passed from the tank to the filter and from the filter to the tank; and a pump for forcing the flow of water passing through said piping in either direction.

25. Water softening apparatus including a settling tank for receiving water to be softened; means for heating the water entering the tank; means for supplying softening chemical to the water entering the tank; a filter; and a passage through which water is passed from the tank to the filter and from the filter to the tank.

26. Water softening apparatus including a settling tank for receiving water to be softened; means for supplying softening chemical to the water entering the tank; a filter, and means including a single passage serving both for passing water from said tank through the filter in one direction and from said tank through the filter in the reverse direction back to said tank.

27. The combination with a tank for treating liquids, of a filter, means for directing a flow of liquid from said tank through said filter, and means for reversing the direction of flow of the liquid to cleanse the filter, and means for returning the cleansing liquid after passage through the filter in reverse direction to the body of liquid within the tank.

28. Liquid treating apparatus comprising a settling chamber, an uptake chamber, a filter, means for conveying liquid from said uptake chamber through the filter in one direction, and means for directing liquid from said uptake chamber through the filter in the opposite direction and thence to said settling chamber.

29. Apparatus for treating a liquid, comprising a treatment tank, a heater for delivering heated liquid to said tank, a filter, means for directing a flow of liquid from said tank through said filter in one direction, and means for directing a flow of heated liquid from said tank through said filter in the opposite direction and back to the tank.

30. Apparatus for treating a liquid, comprising a treatment tank, a heater for delivering heated liquid to said tank, a filter, means for directing a flow of liquid from said tank through said filter in one direction, and means for directing a flow of heated liquid from said tank through said filter and back to the tank.

31. The process of treating water which consists in supplying heated water to a treatment tank, passing a portion of said water through a filter, washing the filter with a portion of said water, and returning the wash water to the tank.

32. The process of treating water which consists in supplying heated water to a tank, passing water from said tank through a filter, and cleansing said filter by passing water from said tank through said filter in the reverse direction and returning said cleansing water to the tank.

33. The process of treating liquids which consists in heating a body of liquid, passing the liquid through a filter utilizing a portion of said liquid to cleanse the filter and returning such cleansing portion to said body of liquid.

34. Water treatment apparatus comprising a treating tank having inflow and outflow chambers in open communication at the lower ends thereof, means for introducing water to be treated to the upper end of the inflow chamber, means for withdrawing said water when treated from the upper end of the outflow chamber, a filter, means for directing treated water from the outflow chamber through said filter to the point of use, and means for directing treated water from the outflow chamber through said filter in the reverse direction and back to the inflow chamber.

In witness whereof, I hereunto subscribe my name this 6th day of April A. D., 1920.

KENT W. BARTLETT.